Jan. 4, 1955  A. R. MEYER  2,698,891
WELDING METHOD AND WELDING TOOL
Filed July 1, 1952  6 Sheets-Sheet 1

INVENTOR.
Amel R. Meyer,
BY
F. D. Prager
Atty.

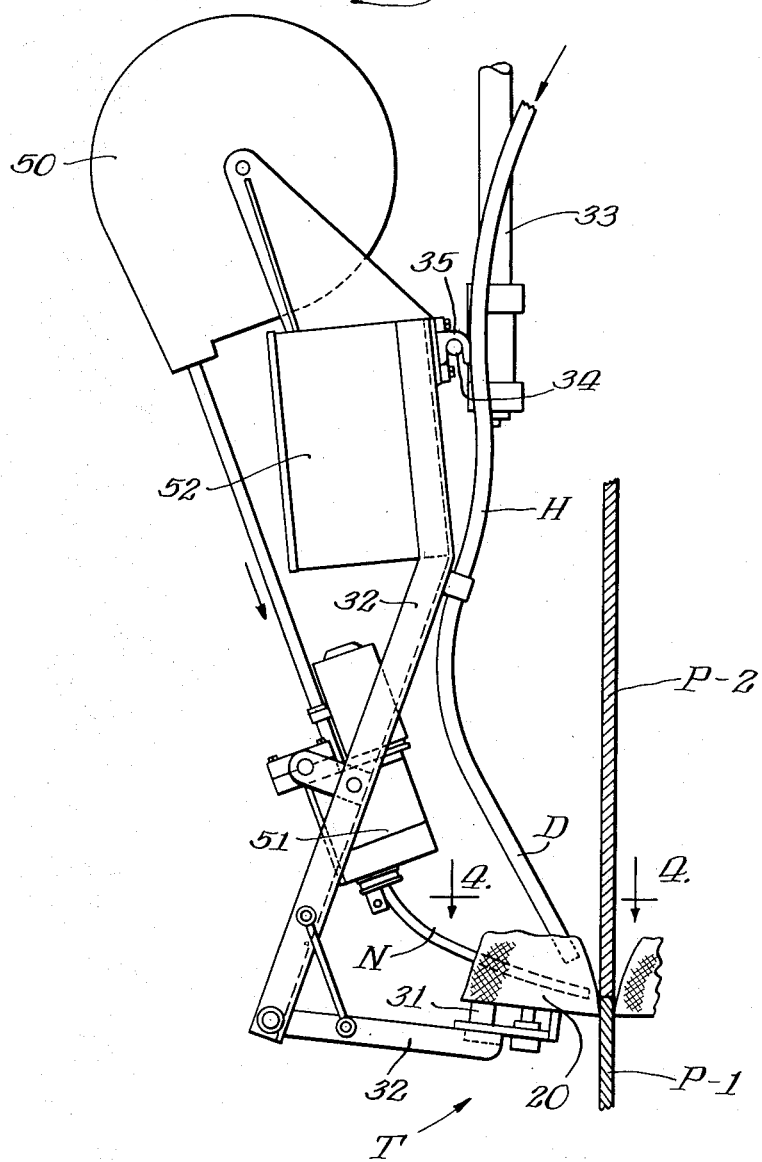

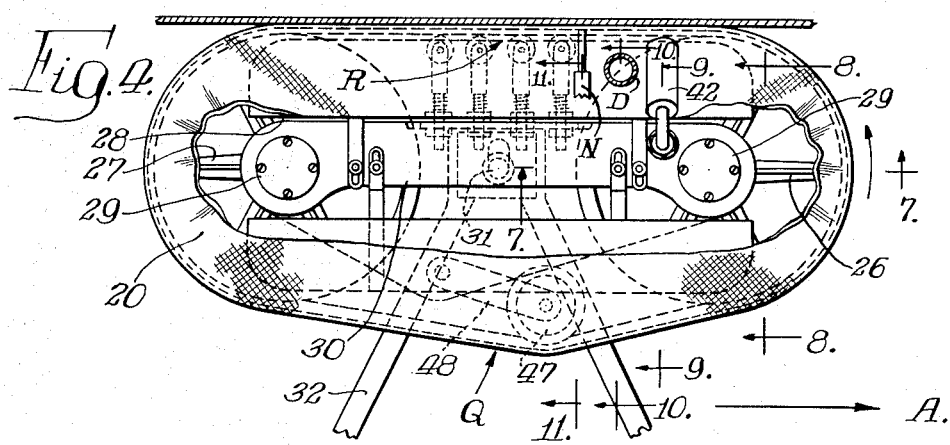
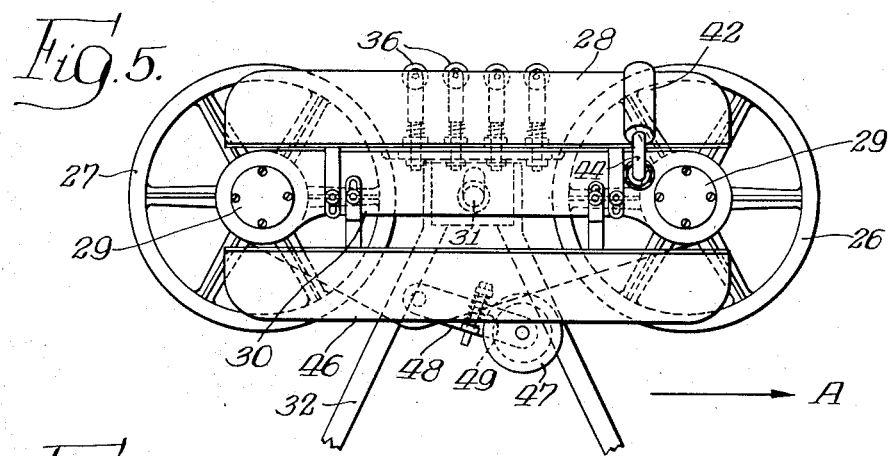
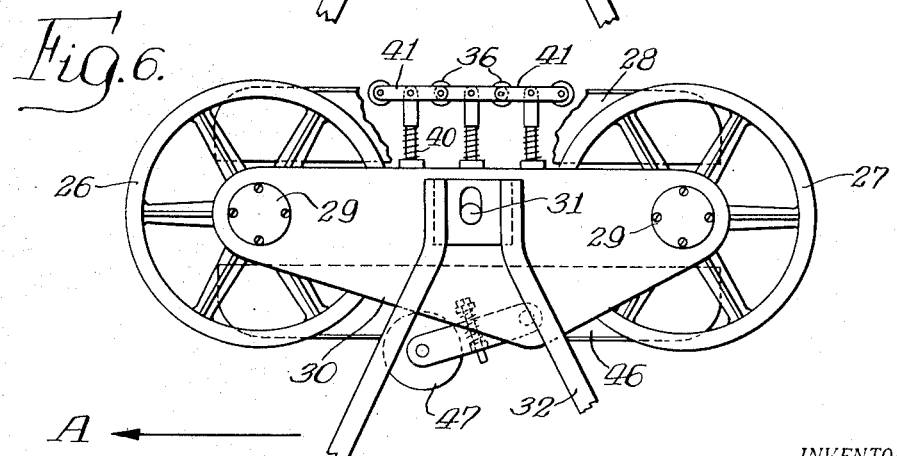

Jan. 4, 1955     A. R. MEYER     2,698,891
WELDING METHOD AND WELDING TOOL
Filed July 1, 1952     6 Sheets-Sheet 4
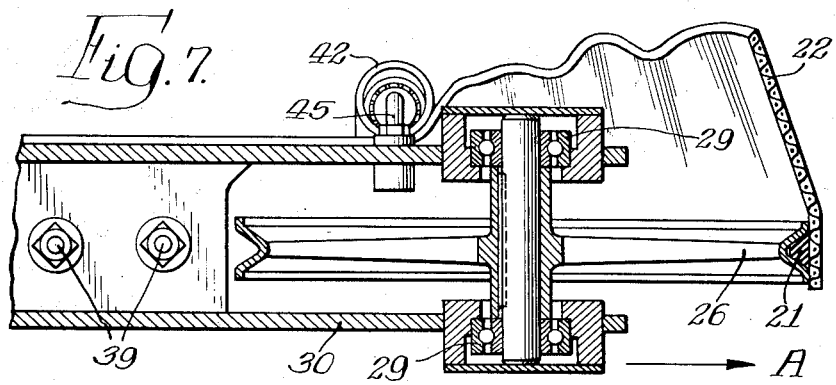
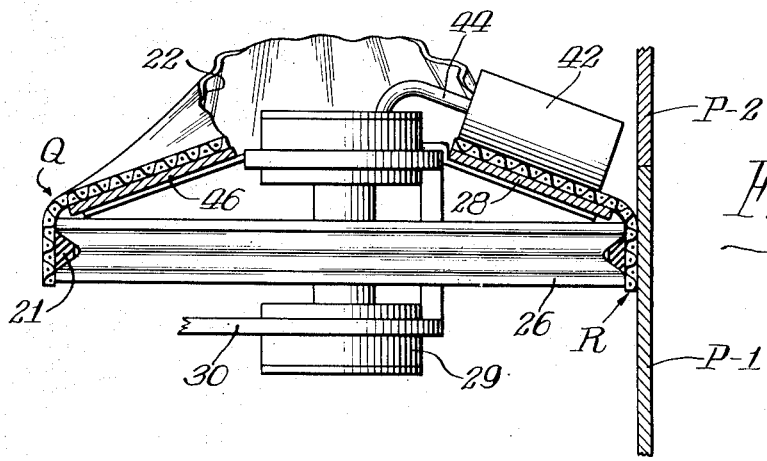
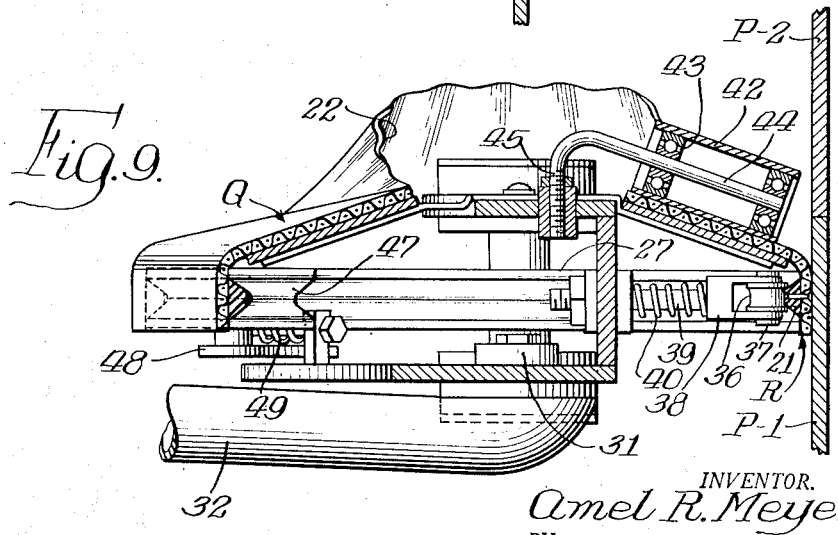
INVENTOR.
Amel R. Meyer,
BY
F. D. Prager
Atty.

Jan. 4, 1955  A. R. MEYER  2,698,891
WELDING METHOD AND WELDING TOOL
Filed July 1, 1952  6 Sheets-Sheet 5
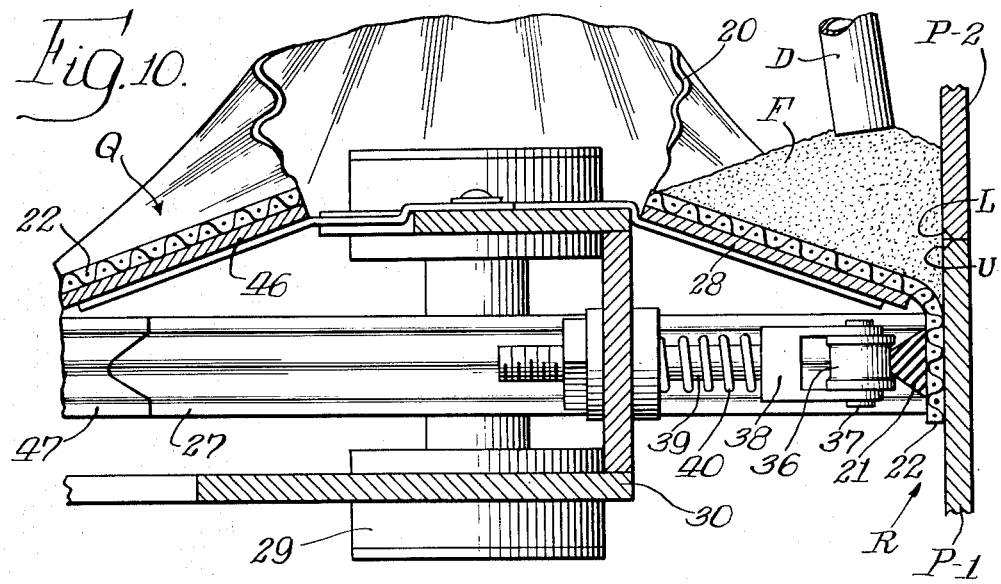
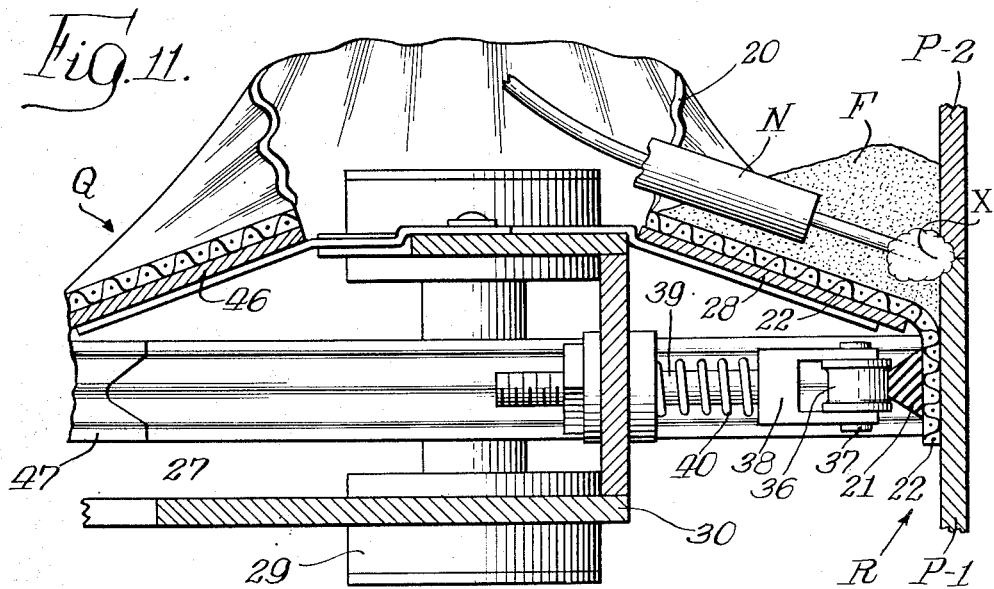
INVENTOR.
Amel R. Meyer,
BY
F. D. Prager
Atty.

Jan. 4, 1955 A. R. MEYER 2,698,891
WELDING METHOD AND WELDING TOOL
Filed July 1, 1952 6 Sheets-Sheet 6
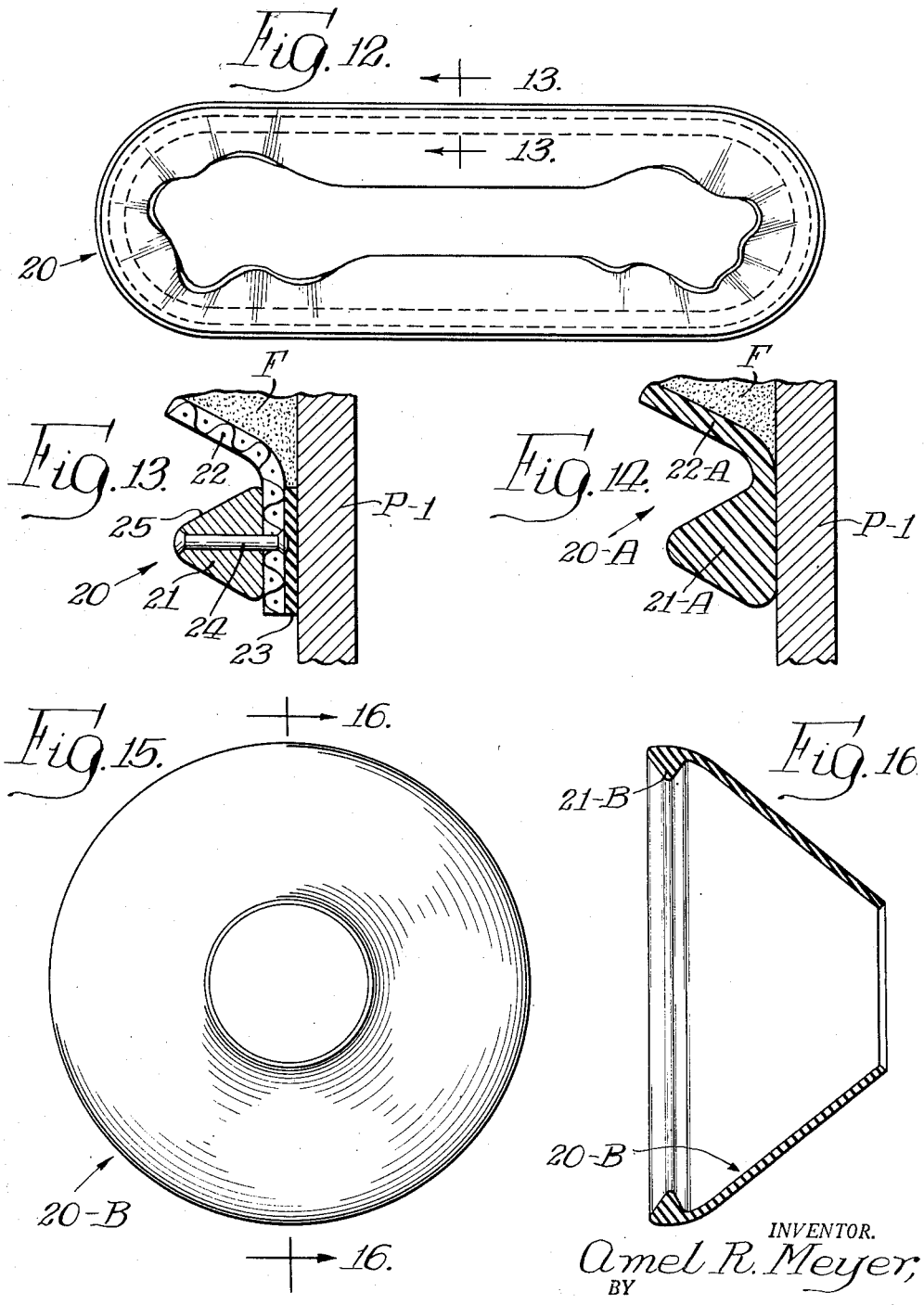

United States Patent Office 2,698,891
Patented Jan. 4, 1955

2,698,891

WELDING METHOD AND WELDING TOOL

Amel R. Meyer, Griffith, Ind., assignor to Graver Tank & Mfg. Co., Inc., East Chicago, Ind., a corporation of Delaware Application July 1, 1952, Serial No. 296,683

12 Claims. (Cl. 219—8)

This invention relates to welding tools and particularly to flux-supporting tools for submerged arc welding on stationary vertical plates. This kind of welding work is encountered mainly in the field of construction of large storage tanks and the like.

Until recently, submerged arc welding could be used only in the so-called flat downhand position, that is, with a work piece surface supporting the required bed of flux particles. Attempts were made to support such a bed in contact with an upright work piece surface, but considerable difficulties were encountered. Some but not all of these difficulties have been overcome in the past. The submerged arc welding on vertical plates was still a cumbersome process, and the resulting seams were not quite as good as those placed in flat position.

I found that the trouble was traceable mainly to a lack of stability of the flux bed relative to the vertical work piece surface, in the welding zone. In the first place it was necessary more safely and more simply to avoid downward gravitational escape of flux particles. In addition I found it necessary to eliminate even the slightest tendency of the flux particles to travel horizontally across the welding zone.

The new flux belt and support, disclosed herein, achieves this object, while earlier ones failed to do so. The new device is also improved in terms of service life and general economy. It has other advantages, as will appear hereinafter.

The manner in which these improvements are obtained will become clear from the detailed description of certain embodiments, which follows.

In the drawing:

Figure 3 is a sectional elevation taken along lines 3—3 in Figure 2, on an enlarged scale; duplicated parts of the mechanism being omitted.

Figure 4 is a detail plan view, partly in section, taken along lines 4—4 in Figure 3.

Figure 5 is a view similar to Figure 4 but without the flux belt.

Figure 6 is a bottom view of a detail generally similar to that of Figure 5 but slightly modified.

Figures 7, 8 and 9 are cross-sectional views taken along the corresponding lines in Figure 4, on a larger scale.

Figures 10 and 11 are cross-sectional views taken along the corresponding lines in Figure 4, on a still larger scale.

Figure 12 is a plan view of the flux belt of Figure 4 without the mechanism, on the approximate scale of Figure 4.

Figure 13 is an enlarged cross-section through a part of said belt along lines 13—13 in Figure 12.

Figure 14 is a view generally similar to Figure 13 but showing a modified belt.

Figures 15 and 16 are views similar to Figures 12 and 13 respectively but showing a further modification of the flux belt.

Figure 1:
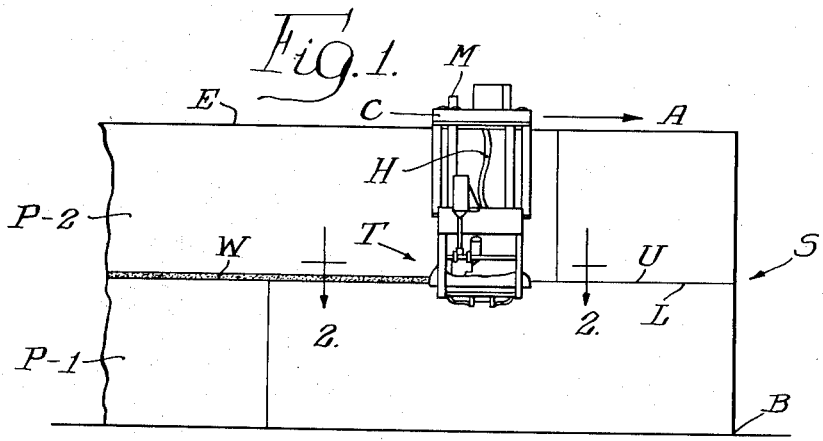
Figure 1 is a front elevation of a typical form of the new tool with its supporting means, in operative position on a tank shell under construction.

The new tool T is suspended from a carriage C traveling in direction A on the top edge E of a tank shell S under construction. It is assumed that the first ring of shell plates P-1 has been constructed, on a tank bottom B, and that plates P-2 for a second ring have been positioned on top of said first ring. A working area for the formation of a horizontal weld seam W is provided by the upper edge surfaces U of the first ring and the lower edge surfaces L of the second ring. The tool T serves to traverse an electric arc X (Figure 11) along this working area, submerged in a flux bed F. The tool also serves to support this flux bed in an improved motionless relation to the working area during the welding cycle.

This is achieved largely by a novel use of a flexible belt 20, in conjunction with suitable means for the supply of welding electrode material and current to the working area. In the form best shown in Figures 12 and 13 the belt 20 comprises a pressurizing V-belt 21; a wide, flat, flexible, heat-resistant belt 22 secured to the outside of the V-belt; and a narrow, soft sealing strip 23 secured to the outside of the flat belt.

The wide flat belt 22 is preferably made of wire-reenforced asbestos fabric and has the flat surface of an elongated edge portion thereof secured to the outer V-belt surface, by rivets 24 or the like. Such rivets have their inner heads at the narrowest part of the inner surface 25 of the V-belt. The outer rivet heads are covered by the seal strip 23, which may consist of sponge rubber or the like, cemented to the flat belt opposite the V-belt. In the drawing the thickness of the belt elements 22, 23 is exaggerated. It is possible and often desirable to use thinner materials. If the belts, and mainly the ends of the flat belt 22 are spliced it is somewhat important that uniform flexibility be preserved. The belt 22 must be flexible in different directions across the plane of its fabric.

The V-belt 21, as best shown in Figures 4, 7 and 8, is trained around and supported by a pair of pulleys 26, 27 rotatable in a flat plane and spaced from one another to form two parallel, somewhat elongated runs R and Q of the flux belt; one (R) in contact with the shell S and the other (Q) as a return run. That portion of the flat, flexible fabric belt 22 which is not directly secured to the V-belt 21 tends to sag down, mainly along the elongated runs R and Q. It is prevented from such sagging down, beyond a certain level, by a rigid tray 28, which extends along the working run R and supports the upper part of the flat belt 22, while the lower part of said belt is pressed against the shell. The tray 28 and the bearings 29 for the two pulleys—preferably frictionless bearings as shown—are secured to a rigid frame 30 so that the belt 20 can be displaced along the tray 28 with a minimum of effort. No special motor is required for this purpose; the motor M, propelling the carriage C, effects the displacement of the belt 20 about the frame 30 as the entire tool T moves along the shell S.

Figure 2:
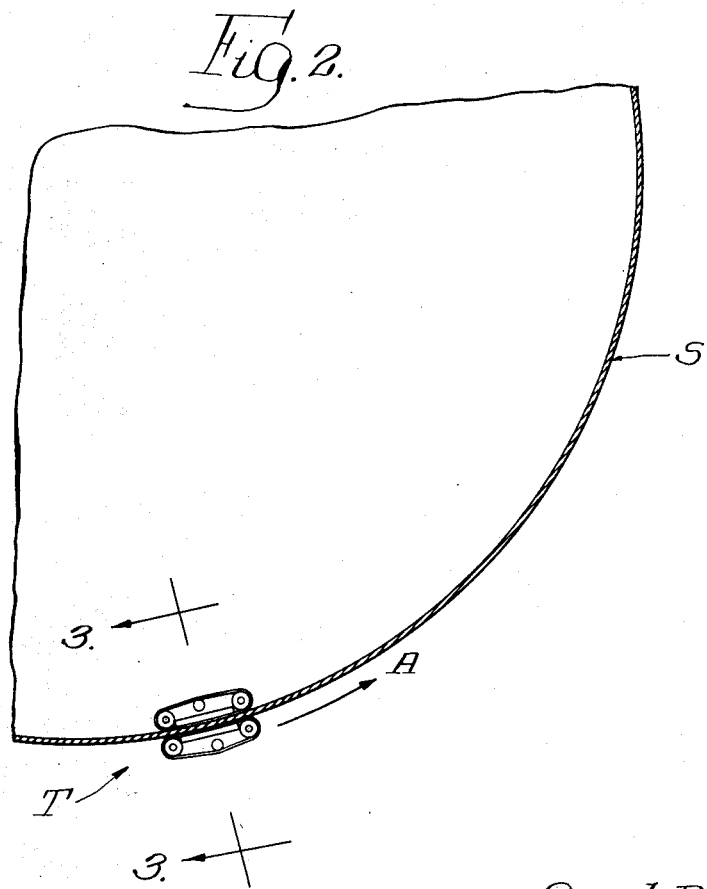
Figure 2 is a sectional plan view of the structure shown in Figure 1, the section being taken along lines 2—2 in Figure 1.

The center of the frame 30 is pivoted on an upright pivot pin 31 supported by a chassis 32. As shown in Figures 2 and 3 there may be a pair of chassis 32, one inside the shell S and the other outside. Both can generally be considered as being identical with one another, and only one of them will be described in detail.

The carriage C comprises a pair of vertical columns 33, for the support of said one chassis 32. These columns are spaced from one another along the edge E, rigidly secured to the body of the carriage, and extending downwards therefrom. Their lower ends have adjustably secured thereto and interconnecting the same, a horizontal bar or bearing means 34, providing support for a pair of hooks 35 whereby the chassis 32 is swingingly supported. The bar 34 extends tangentially of the shell S whereon the carriage travels, thereby allowing the frame 32 to swing in planes normal to the work area or shell surface, whether that surface be regularly or irregularly curved. In this manner the flux bed supporting tool T can be kept in uniform contact with the working zone; it is merely necessary to keep the center of gravity of the swingable unit spaced from the shell beyond the vertical plane of the pivot bar 34. The contact pressure is kept substantially equal for both ends of the working run R, by virtue of the centrally pivoted construction; the frame 30 acts as a spreader bar for the contact pressure.

As a result, when the carriage C travels along the top edge E, the outer, lower surface portion of the working run R of the flexible flux belt element 22 is pressed against the shell surface and kept motionless relative thereto.

Attention is directed to the fact that the pulleys 26, 27 are idlers, rotated directed by the V-belt 21 which in turn is rotated by the flat belt portion 22, 23 in contact with the shell. In earlier constructions, flat, flexible flux belts were actuated by the belt supporting pulleys, not vice versa. As a result, such earlier belts were only approximately motionless relative to the shell surface; they allowed some longitudinal travel of flux particles. Attempts to establish traction pressure through the belt would have required complicated mechanisms and would have stressed the belt objectionably.

Even slight longitudinal travel between the flux bed and the shell was very harmful, mainly since it tended to be irregular and jerky, due to the uncontrollable nature of the frictional resistances and frictional traction forces causing such longitudinal travel. The result was injury to the weld seam being deposited. Such injury is avoided by the new system.

The pressure upon the lower, vertical portion of the flat belt, as well as the flat, flux-supporting position of the upper belt portion, can also be obtained in different manners. For instance, in accordance with Figure 14 the V-belt and flat belt portions of the flux belt can be molded or rolled or extruded as an integral body 20–A, having an upper, relatively thin part 22–A and a lower, relatively thick, inwardly projecting part 21–A.

It is also possible to promote the desirable flat position of the upper part of a belt 20 or 20–A, regardless of the position of its lower part, by fabricating such a belt 20–B in frusto-conical shape with the bead 21–B at the wide base, as shown in Figures 15 and 16.

In all such cases the flux belt has a wide surface portion, not a mere side edge, in contact with the shell and positively pressed against the shell, thereby insuring the absence of cracks and the undisturbed support of the flux and melt, even in the event that the belt has or develops wrinkles, ragged edges or other irregularities due to wear and tear. Even the presence of large particles of impurities in the flux will then be harmless; suitable contact pressure will still prevent the los of the finest powdered flux. This sealing action is aided particularly by the feature that the belt elements 21, 22 and 23 have outwardly decreasing hardness or rigidity, aside from the special operative shape of the flat belt or apron 22.

The contact pressure is preferably applied to the entire working run R of the flux belt, between the end pulleys 26, 27, by means of a series of rollers 36 lying and rotating in the flat planes of the end pulleys but having smaller diameters, as best shown in Figures 4, 5, 10. Each auxiliary roller is held on a vertical pivot 37, journaled in a clevis 38 which in turn is secured to the end of a more or less horizontal rod 39 slidably supported in the frame 30. A compression spring 40 surrounds the free end of each sliding rod 39 and bears against the clevis 38 and frame 30 to urge the roller 36 toward the shell S. The rim contour of each roller 36 matches the inside surface 25 of the V belt 21. Thus the successive parts of the working run R of the flux belt 20 are kept in close contact with the shell, between as well as at the spaced pulleys 26, 27, whether the shell be convex or concave or irregularly curved.

Figure 6 shows a form of auxiliary rollers, wherein a horizontal pressure spreading link 41 distributes the pressure of each spring 40 to two rollers 36; the spring bearing against the middle of the link. In this manner the distance from the outermost auxiliary roller 36 to the shell contact area of the adjacent pulley 26 or 27 can be reduced and thus the contact pressure can be distributed more uniformly over the length of the run R. It may further be desirable to interconnect the ends of the spreader bars 41 in order to maintain uniformity of pressure even in case of breakage of any one spring 40, or of similar trouble.

I further prefer to guide the upper or free portion of the flat belt 22 from its more or less upright position (maintained at the ends of the run due to its curving around the pulleys) into the required flat position, by means of a guide finger or guide roller 42, located adjacent one end of the tray 28; see Figures 4, 8 and 9. This finger extends parallel with the surface of the tray 28 and at right angles to the direction of the working run R. Such a guide roller may be held by bearings 43 on a shaft 44 which in turn may be connected to a vertical support post 45, suitably pivoted to the frame 30. One such guide roller, at the leading end of the frame (in direction A) is usually sufficient. Even strong and rugged belts 20 can thus be guided into the proper flat position directly past the leading end pulley 26, and as a result the discharge spout D of the flux supply hose H and the guide nozzle N for the electrode wire can be located in close sequence, adjacent the leading pulley 26 and guide finger 42; see Figure 4. A major part of the working run R is thus available for the purpose of holding the flux bed F in contact with congealing melt; thereby reducing the required overall size and bulk of the tool T.

A second tray 46 is shown, parallel with and generally similar to the working support tray 28 but extending along the return run Q, to prevent irregular sagging in that run. Any irregular sagging would be likely to create wave-like actions in the belt, disturbing the desired motionless position of the flux bed. I further counteract such irregularities by a tension roller 47 interposed on the return run Q. This roller may be carried by a lever 48, pivoted to the frame 30 for swinging movements in a flat plane, and biased outwardly by a spring 49. Installation and removal of the flux belt are thus facilitated, while in operation, the belt 20 and mainly its working part R is held in taut and properly shaped condition.

Operation comprises the feeding of flux, electrode material and welding current to longitudinally successive portions of the upper and lower plate edges U and L, to convert such edges into a weld seam W by the arc X. For this purpose the swinging chassis supports, among other things, a reel 50 (Figure 3), from which electrode material is fed into and through the nozzle N by a motor reducer 51, at a speed suitably controlled in known manner by instruments (not shown) contained in a cabinet 52. These instruments control also the density and other characteristics of the welding current, which is brought to the electrode and work piece by suitable conductors (not shown).

The arc X (Figure 11) is submerged in the flux bed F, poured onto the flux belt 20 by the flux discharge spout D (Figure 10) adjacent the hold-down roller 42 (Figure 9). In order to avoid disturbance of the liquid melt produced by the arc, as explained in my Patent 2,636,524, the poured-on flux bed must be protected from downward escape of flux particles by distributed pressure between an edge portion of the flux belt and the shell. This is achieved in most efficient and at the same time simple manner by the rollers and pulleys 26, 27, 36 and associated parts; preferably with the aid of a swinging suspension of the support frame, as explained in my application S. N. 252,918 and shown herein at 32, 34 etc.

In order to avoid disturbance of the liquid melt, the poured-on flux bed must also be protected from lateral movement along the shell, throughout the welding zone. This is achieved by the integral structure of the upper and lower parts of the flat, flexible belt 22; the lower part being used in effect as the outermost part of an outwardly pressurized V-belt and held motionless relative to the shell in the working run R, and the upper part being held in proper position to form the bottom support of the poured-on flux bed.

At the trailing end of the welding zone, adjacent the end roller 27, flux is continuously removed, said bottom support being withdrawn from the shell. The excess flux, not converted into adherent slag, can then be recovered, for resupply through the hose H and spout D at the leading end of the unit, by recovery means (not shown), as is well known to the art.

I claim:

1. In a method of submerged arc welding a horizontal seam in an upright work piece surface, the steps of extending below and adjacent the seam, in rolling contact with the surface, an endless flux belt comprising a wide, flat belt element and a narrow V-belt element inwardly projecting therefrom, the V-belt element being extended in a flat plane and the flat belt element extending away from the surface, above the V-belt element; supporting flux on the flux belt; and traversing the flux belt and an arc submerged in the flux along the seam.

2. An endless flux belt comprising an innermost, narrow, relatively rigid V-belt element; an intermediate, wide, highly flexible heat-resistant, flat belt element; and an outermost, narrow, highly compressible flat belt element opposite the innermost element.

3. A flux support comprising a set of pulleys rotatable in a flat plane; an endless flat belt with a single, longitudinally extending, inwardly projecting ridge trained over the pulleys; and means to urge all pulleys of the set and thereby the belt against a work piece surface transverse of said plane.

4. A flux support according to claim 3 wherein the set comprises a pair of end pulleys and a plurality of intermediate pulleys and wherein the means to urge all pulleys against the work piece surface comprises a frame for the flux support adapted gravitationally to urge the end pulleys against the surface and a mechanism adapted yieldably to press the intermediate pulleys against the surface.

5. A flux support according to claim 3 additionally comprising a tray extending between the end pulleys and lying in a plane slightly inclined inwardly and upwardly from a run of the lower edge.

6. A flux support according to claim 5 additionally comprising a guide finger adjacent one end pulley, extending above and parallel to the plane of the tray and normal to said run.

7. A flux support according to claim 6 wherein the guide finger consists in a roller approximately as long as the tray is wide.

8. Support means for a wide, generally flat flux belt with a narrow, longitudinally, inwardly projecting strip, comprising a frame; a pair of end rollers adapted to engage the strip and pivoted to the frame; means to hold the frame adjacent an upright work piece surface so that the strip extends parallel with the surface; and roller means between the end rollers, adapted to engage the strip so that a marginal, flat surface of the belt, by means of the strip, is pressed against the work piece surface.

9. Support means according to claim 8 wherein the means to hold the frame comprises an upright pivot intermediate the end rollers.

10. Support means according to claim 8 wherein the means to hold the frame comprises a horizontal pivot for the frame, substantially above the same.

11. A flux support according to claim 3 wherein two of the pulleys, at the ends of the set, are larger than the other pulleys and which comprises a frame and pulley carriers thereon, said two pulleys being directly pivoted to the frame, the other pulleys being pivoted to the carriers and the carriers being pressed against said surface by springs abutting against the frame.

12. Support means according to claim 11 additionally comprising a tension roller adapted to engage the belt opposite said other pulleys and spring loaded away from said surface.

References Cited in the file of this patent

UNITED STATES PATENTS

| Number | Name | Date |
|---|---|---|
| 1,100,654 | Church | June 16, 1914 |
| 1,271,428 | Burns | July 2, 1918 |
| 1,543,843 | Gwinn | June 30, 1925 |
| 2,158,675 | Davies | May 16, 1939 |
| 2,294,439 | Bagley | Sept. 1, 1942 |
| 2,472,513 | Bergquist | June 7, 1949 |
| 2,529,812 | Peters | Nov. 14, 1950 |
| 2,534,679 | Place | Dec. 19, 1950 |